United States Patent
Smeal et al.

(10) Patent No.: US 11,933,353 B2
(45) Date of Patent: Mar. 19, 2024

(54) THREE PIECE FAILSAFE CLEVIS

(71) Applicant: The Boeing Company, Chicago, IL (US)

(72) Inventors: Andrew Smeal, Melbourne (AU); Kevin Tsai, Seattle, WA (US)

(73) Assignee: The Boeing Company, Chicago, IL (US)

( * ) Notice: Subject to any disclaimer, the term of this patent is extended or adjusted under 35 U.S.C. 154(b) by 141 days.

(21) Appl. No.: 17/665,283

(22) Filed: Feb. 4, 2022

(65) Prior Publication Data

US 2022/0299063 A1    Sep. 22, 2022

Related U.S. Application Data

(60) Provisional application No. 63/161,872, filed on Mar. 16, 2021.

(51) Int. Cl.
| | |
|---|---|
| *F16C 11/04* | (2006.01) |
| *B64C 9/02* | (2006.01) |
| *B64C 9/16* | (2006.01) |

(52) U.S. Cl.
CPC ............. *F16C 11/045* (2013.01); *B64C 9/02* (2013.01); *B64C 9/16* (2013.01); *F16C 2326/43* (2013.01)

(58) Field of Classification Search
CPC .... B64C 9/02; B64C 9/16; B64C 7/00; B64C 5/10; B64C 5/08; B64C 3/50; F16C 11/045

See application file for complete search history.

(56) References Cited

U.S. PATENT DOCUMENTS

| | | | |
|---|---|---|---|
| 4,444,368 A | | 4/1984 | Andrews |
| 4,786,202 A | * | 11/1988 | Arnold ................. F16C 11/045 403/11 |
| 5,154,382 A | * | 10/1992 | Hoshino ................ F16M 11/10 248/185.1 |
| 2010/0127127 A1 | | 5/2010 | Manzano |
| 2017/0267339 A1 | * | 9/2017 | Bergeson ................ B64C 27/48 |
| 2019/0152616 A1 | * | 5/2019 | Pautis ..................... B64D 27/18 |
| 2020/0369396 A1 | * | 11/2020 | Labarthe ................. B64D 27/26 |
| 2021/0371080 A1 | * | 12/2021 | Campana .................. B64C 7/00 |

FOREIGN PATENT DOCUMENTS

| | | |
|---|---|---|
| EP | 3323712 A1 | 5/2018 |
| GB | 555514 A | 8/1943 |

\* cited by examiner

*Primary Examiner* — Tien Q Dinh
*Assistant Examiner* — William L Gmoser
(74) *Attorney, Agent, or Firm* — Felix L. Fischer

(57) ABSTRACT

A three piece failsafe clevis includes a center portion having a center top surface, a planar first outer surface and a planar second outer surface. The second outer surface is oppositely oriented to the first outer surface. A channel in the center portion is configured to receive a tension and compression member. A left lateral portion is connected adjacent the first outer surface. The left lateral portion has a planar first inner surface received against the first outer surface and a left top surface coplanar with the center top surface. A right lateral portion is connected adjacent the second outer surface. The right lateral portion has a planar second inner surface received against the second outer surface and a right top surface coplanar with the center top surface.

20 Claims, 16 Drawing Sheets

THREE PIECE FAILSAFE CLEVIS

REFERENCES TO RELATED APPLICATIONS

This application claims priority of U.S. provisional application Ser. No. 63/161,872 filed on Mar. 16, 2021 entitled THREE PIECE FAILSAFE CLEVIS having a common assignee with the present application, the disclosure of which is incorporated herein by reference.

BACKGROUND INFORMATION

Field

This disclosure relates generally to the field of aircraft deployment systems having an underwing support with a three piece failsafe clevis.

Background

Aircraft employ deployment systems to articulate surfaces. For example commercial aircraft have flaps which deploy to increase camber and chord of the wings for enhanced performance in take-off and landing. Various mechanical arrangements have been developed to deploy the flaps from retracted to extended positions. Flap supports typically extend below the lower surface of the wing and deployment of the flaps extend portions of the flap and flap support elements below the wing. Principle structural elements (PSE) in the flap support elements are subject to failsafe requirements. This can mean "back to back" duplication of sections of the structure which are primarily loaded in tension. For a lug this is a relatively simple addition to the design but for a clevis it becomes more complicated, expensive, and difficult to build.

Examples can be found on existing commercial aircraft of failsafe clevises used in an underwing support fitting as seen in FIGS. 1A-1C which consist of a main outer portion 2 of the fitting 3, and an inner nested portion 4. This structure requires the interface between these inner and outer portions to include three surfaces orthogonal to each other. For machined parts this requires tighter tolerances that are expensive to meet and result in a higher rate of rejection, as well as necessitating shimming of designed in gaps. Additionally, the fasteners 5 common to both portions of the fitting and the mating part 6 must penetrate a thicker stack than the fasteners 7 solely penetrating the outer portion preventing the use of a single grip length without other structural adaptation. Varying grip lengths makes for a more complicated, slower, and more expensive assembly.

It is therefore desirable to provide an underwing support which overcomes these shortcomings in the prior art.

SUMMARY

Exemplary implementations of a three piece failsafe clevis include a center portion having a center top surface, a planar first outer surface and a planar second outer surface. The second outer surface is oppositely oriented to the first outer surface. A channel in the center portion is configured to receive a tension and compression member. A left lateral portion is connected adjacent the first outer surface. The left lateral portion has a planar first inner surface received against the first outer surface and a left top surface coplanar with the center top surface. A right lateral portion is connected adjacent the second outer surface. The right later portion has a planar second inner surface received against the second outer surface and a right top surface coplanar with the center top surface.

The exemplary implementations provide a method for engaging a tension and compression member with a three piece failsafe clevis. A center portion having a center top surface is received on a lower surface of a wing, the center portion having a left inner flange and left inner tang with a planar first outer surface and a right inner flange and left inner tang with a planar second outer surface, said second outer surface oppositely oriented to the first outer surface. A left lateral portion is connected adjacent the first outer surface using a first plurality of field fasteners with a left outer flange and a left outer tang having a planar first inner surface received against the first outer surface and a left top surface coplanar with the center top surface and received on the lower surface. A right lateral portion is connected adjacent the second outer surface using a second plurality of field fasteners with a right outer flange and a right outer tang having a planar first inner surface received against the first outer surface and a right top surface coplanar with the center top surface and received on the lower surface. The tension and compression member is received in a channel between the left inner tang and right inner tang in the center portion.

BRIEF DESCRIPTION OF THE DRAWINGS

The features, functions, and advantages that have been discussed can be achieved independently in various implementations or may be combined in yet other implementations further details of which can be seen with reference to the following description and drawings.

DETAILED DESCRIPTION

The implementations described herein provide an underwing support with a three piece failsafe clevis incorporating three laterally adjacent components which simplifies the assembly process and reduces or eliminates the need to include designed-in gaps that may need to be shimmed. Common flange thickness in all three laterally adjacent components allows the use of a single, common grip length fasteners. The three piece failsafe clevis maintains necessary structural performance characteristics and compliance to fail safe requirements.

While implementations are described herein with reference to an underwing support structure for a flap system, implementations may be applicable to any Principal Structural Element (PSE).

Figure 1A:
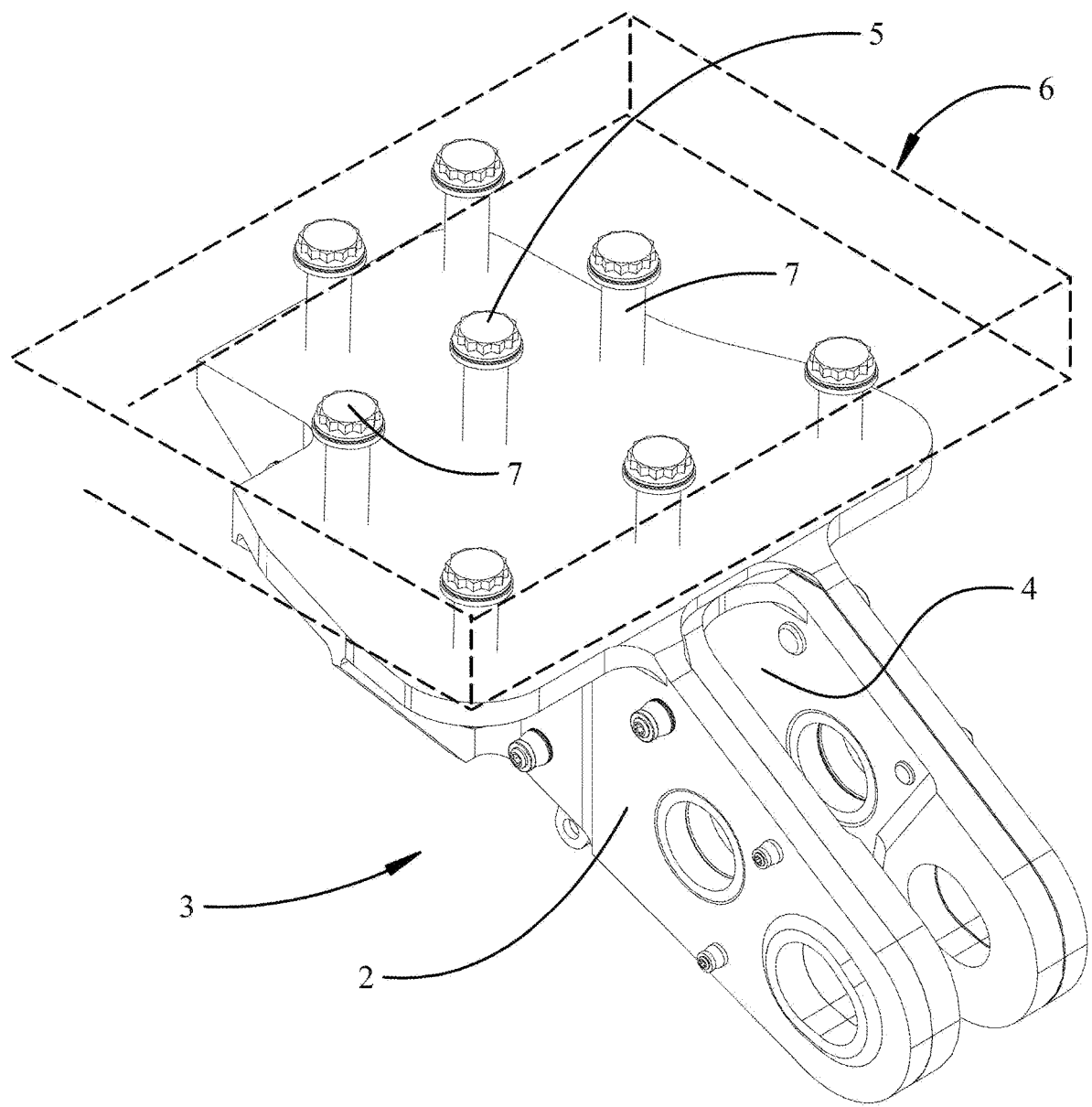
FIG. 1A is a rear pictorial view of a prior art underwing support fitting.
Figure 1B:
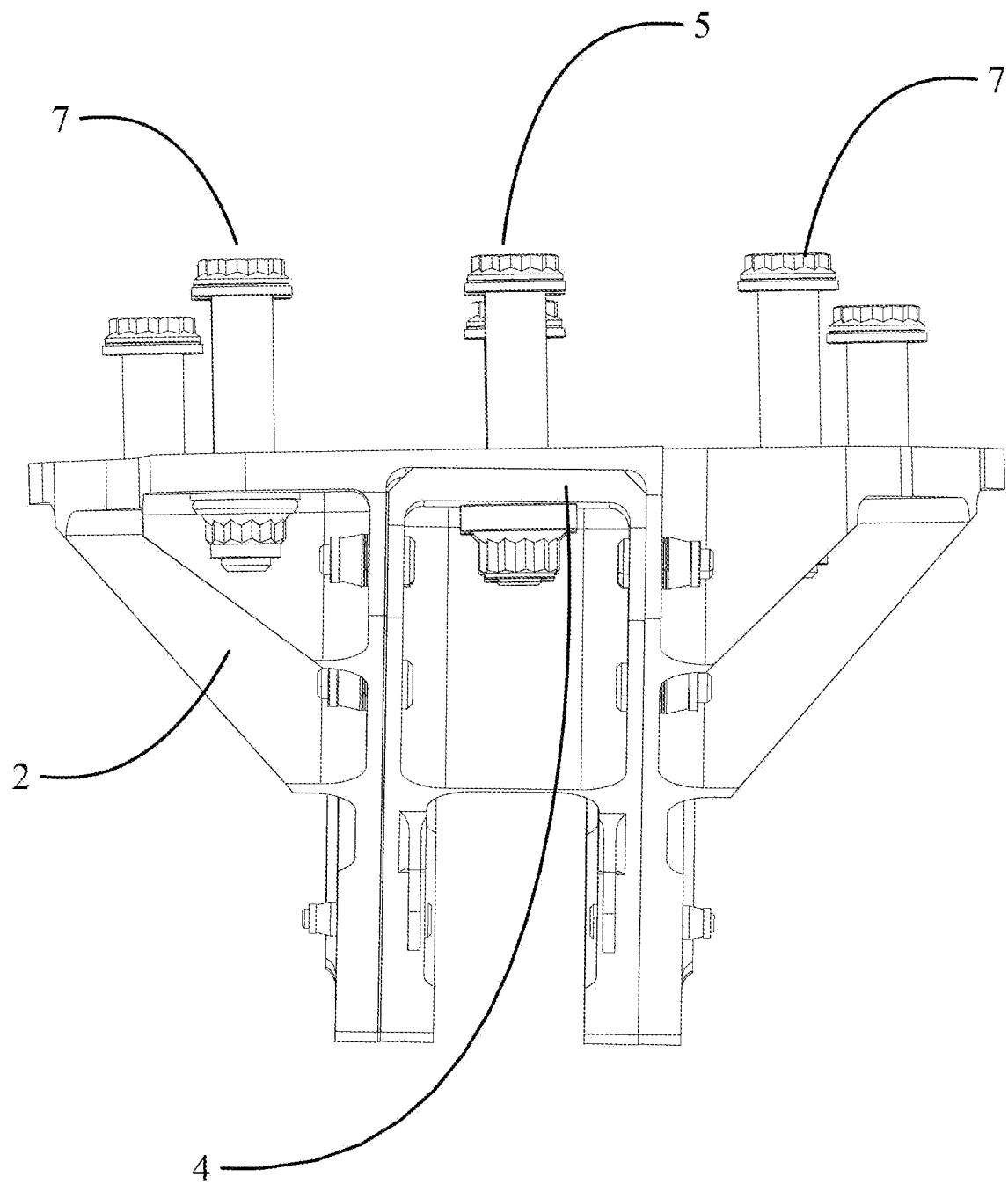
FIG. 1B is a rear view of the prior art underwing support fitting of FIG. 1A.
Figure 1C:
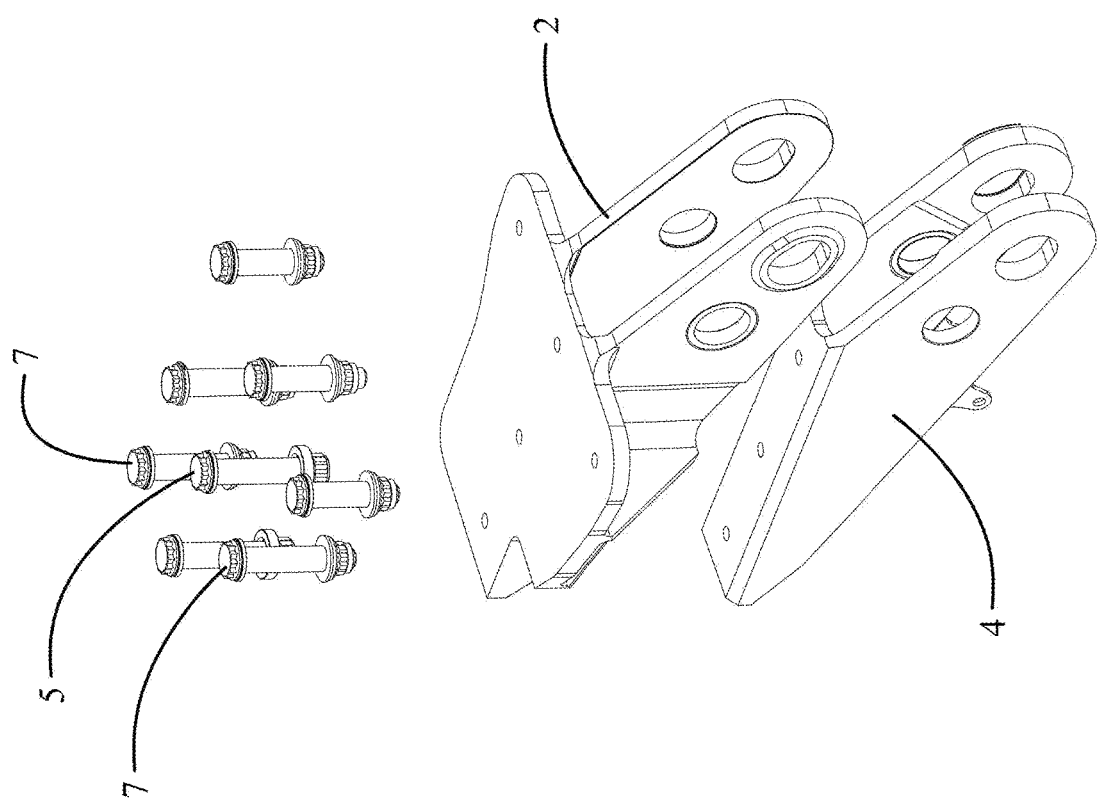
FIG. 1C is an exploded view of the components of the underwing support fitting of FIG. 1A.
Figure 2A:
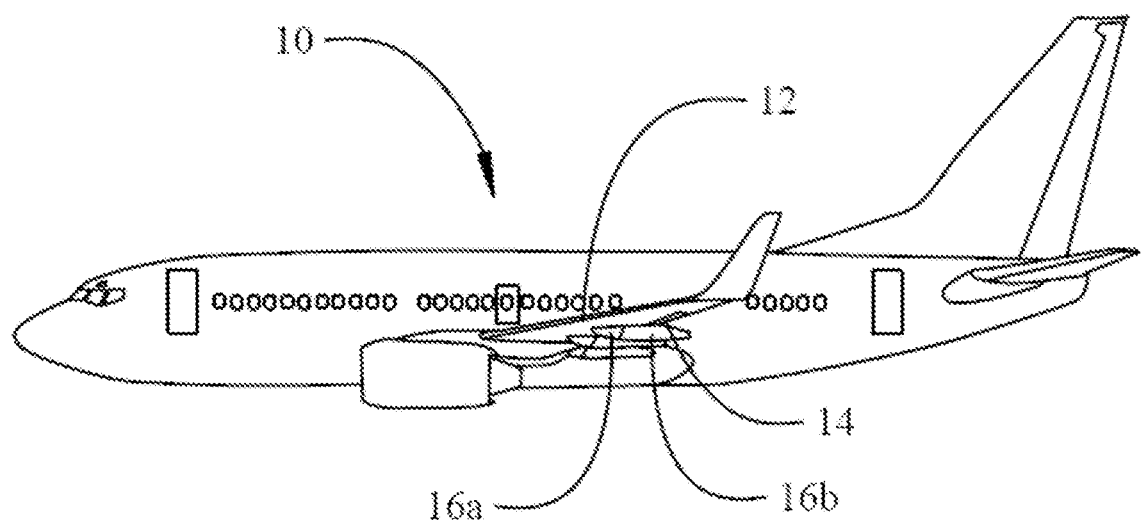
FIG. 2A is a representation of an aircraft in which the implementations disclosed herein may be employed.
Figure 2B:
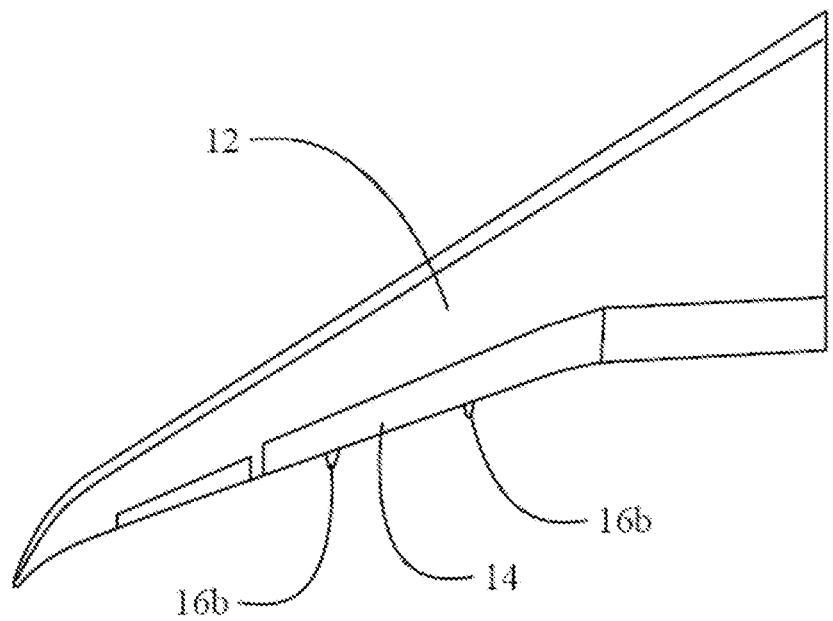
FIG. 2B is a top view of the wing and flaps of the aircraft of FIG. 2A.
Figure 2C:
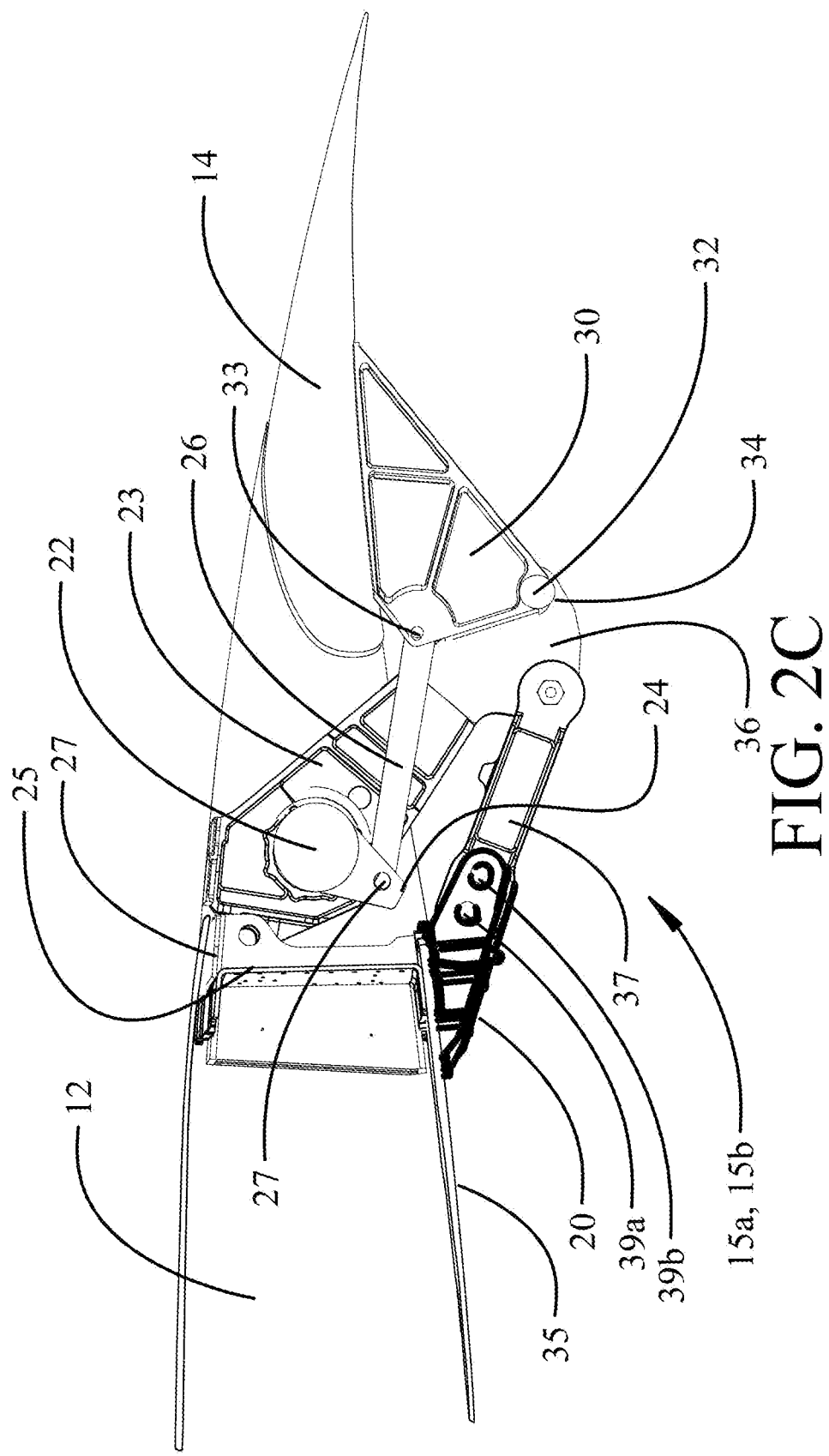
FIG. 2C is a side detailed view (with the fairings removed) of a flap structure incorporating an underwing support fitting for which the disclosed implementations may be employed.

Referring to the drawings, FIGS. 2A, 2B and 2C depict an aircraft 10 having a wing 12 with a system of operating flaps 14. The flaps 14 are engaged to the wing 12 at multiple attachment points with flap supports 15a, 15b at least partially housed within fixed fairings 16a and movable fairings 16b. The flaps 14 are deployed to enhance aerodynamic performance during takeoff and landing with a flap actuation mechanism 18 that causes the flaps 14 and movable fairings 16b to rotate rearward and downward relative to the wing 12.

As seen in FIG. 2C, with the fairings 16a, 16b removed, the flap supports 15a, 15b extending from the structure of the wing 12 each incorporate an underwing fitting employing a three piece failsafe clevis 20, as will be described in greater detail subsequently. In the example shown, a rotary actuator 22, with a drive arm 24 radially extending from the actuator to rotate upon activation of the actuator, is supported between a pair of flap support ribs 23 (the outboard flap support rib removed for clarity). The flap support ribs 23 are connected to the aft spar 25 proximate an upper flange 27. A coupler link 26 is pivotally attached at a leading end to the drive arm 24 with a pivot pin 29 whereby rotation of the actuator rotates the drive arm 24 to extend the coupler link 26.

A spherical bearing or similar engagement element in the leading end of the coupler link 26 may be employed to accommodate angular alignment. The flap 14 is mounted on a carrier beam 30 and rotatably coupled through the flap support ribs 23 to the wing 12. The carrier beam 30 is rotatably attached with an axle 32 at a lower vertex 34 to a trailing clevis 36 formed by the inboard and outboard ribs 23. The coupler link 26 extends from the drive arm 24 to the carrier beam 30 and is pivotally attached to the carrier beam with a second pivot pin 33.

In the example shown, the three piece failsafe clevis 20 attached to a lower surface 35 of the wing 12 provides tension support at the trailing clevis 36 with a tension and compression member 37 or other structural link connected with a pin 38 to the trailing clevis 36. The tension and compression member 37 is engaged by the failsafe clevis 20 with frangible pins 39a and 39b for ground contact safety.

An example implementation of the three piece failsafe clevis 20 is seen in FIGS. 3A-3E. The three piece failsafe clevis 20 has a center portion 102 with a center top flange 104. A body portion 106 has a left inner flange 108a and a right inner flange 108b perpendicularly depending from the center top flange 104. A left inner tang 110a extends rearward from the left inner flange 108a and a right inner tang 110b extends rearward from the right inner flange 108b. The left inner flange 108a and the left inner tang 110a have a planar first outer surface 112 while the right inner flange 108b and the right inner tang 110b have a planar second outer surface 114 parallel to and oppositely oriented to the first outer surface 112. A right inner surface 116a of left inner tang 110a and a left inner surface 116b of right inner tang 110b straddle a channel 118 configured to receive the tension and compression member 37.

A left lateral portion 202 is connected adjacent the first outer surface 112 of center portion 102 while a right lateral portion 302 is connected adjacent the second outer surface 114 of center portion 102 opposite from the left lateral portion 202. Left lateral portion 202 has a left top flange 204. A left outer flange 206 perpendicularly depends from the left top flange 204 and a left outer tang 208 extends rearward from the left outer flange 206. Left outer flange 206 and left outer tang 208 commonly form a planar first inner surface 209. First inner surface 209 of the left lateral portion 202 is received against the first outer surface 112 of center portion 102.

Right lateral portion 302 has a right top flange 304. A right outer flange 306 perpendicularly depends from the right top flange 304 and a right outer tang 308 extend rearward from the left outer flange 206. Right outer flange 306 and right outer tang 308 commonly form a planar second inner surface 309. Second inner surface 309 of the right lateral portion 302 is received against the second outer surface 114 of the center portion 102.

A left top surface 210 of the left top flange 204 and a right top surface 310 of the right top flange 304 are coplanar with a center top surface 111 of the center top flange 104. This provides a single planar top surface 113 for the three piece failsafe clevis 20. The center top flange 104 has a first plurality of holes 120 configured to receive a first plurality of fasteners 122a. The left top flange 204 has a plurality of holes 220 to receive a second plurality of fasteners 122b and the right top flange 304 has a third plurality of holes 320 to receive a third plurality of fasteners 122c. A first thickness 130 of the center top flange 104, a second thickness 230 of the left top flange 204 and a third thickness 330 of the right top flange 304 are equal. This allows the first, second and third pluralities of fasteners, 122a, 122b and 122c to have an equal grip length 123 for attachment to the underwing skin.

The left lateral portion 202 is affixed to the center portion 102 with a first plurality of field fasteners 124 while the right lateral portion 302 is fixed to the center portion 102 with a second plurality of field fasteners 126.

A first array of holes 128a in the left inner flange 108a is in concentric alignment with a first mating array of holes 228a in the left outer flange 206. Similarly, a second array of holes 128b in the right inner flange 108b is in concentric alignment with a second mating array of holes 328b in the right outer flange 306.

A third array of holes 129a in the left inner tang 110a is in concentric alignment with a third mating array of holes 229a in the left outer tang 208. Similarly, a fourth array of holes 129b in the right inner tang 110b is in concentric alignment with a fourth mating array of holes 329b in the right outer tang 308.

The first array of holes 128a, first mating array of holes 228a, third array of holes 129a and third mating array of holes 229a receive the first plurality of field fasteners 124. Similarly, the second array of holes 128b, second mating array of holes 328b, fourth array of holes 129b and fourth mating array of holes 329b receive the second plurality of field fasteners 126.

Figure 3A:
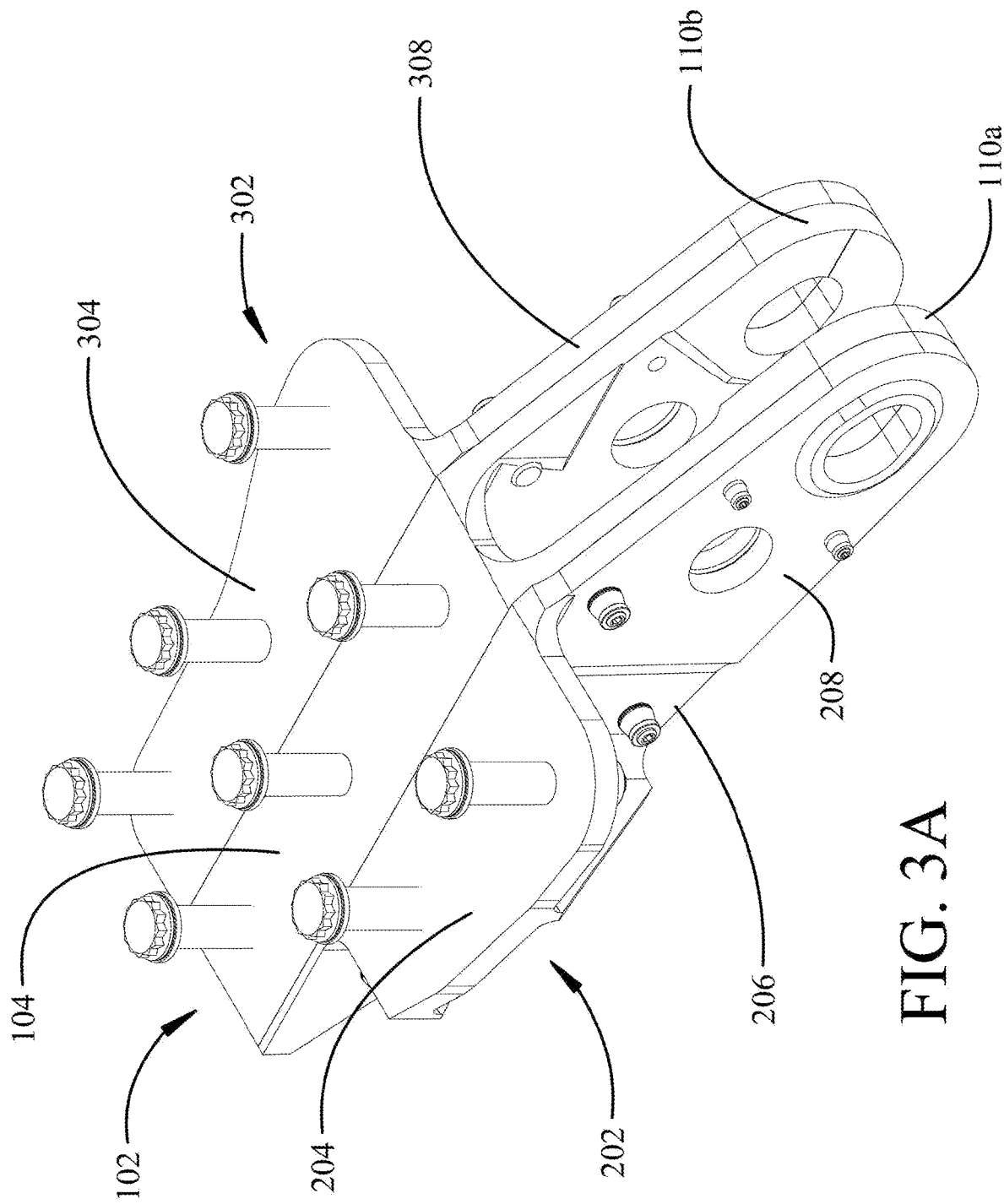
FIG. 3A is a rear pictorial view of a three piece failsafe clevis for an underwing support fitting.
Figure 3B:
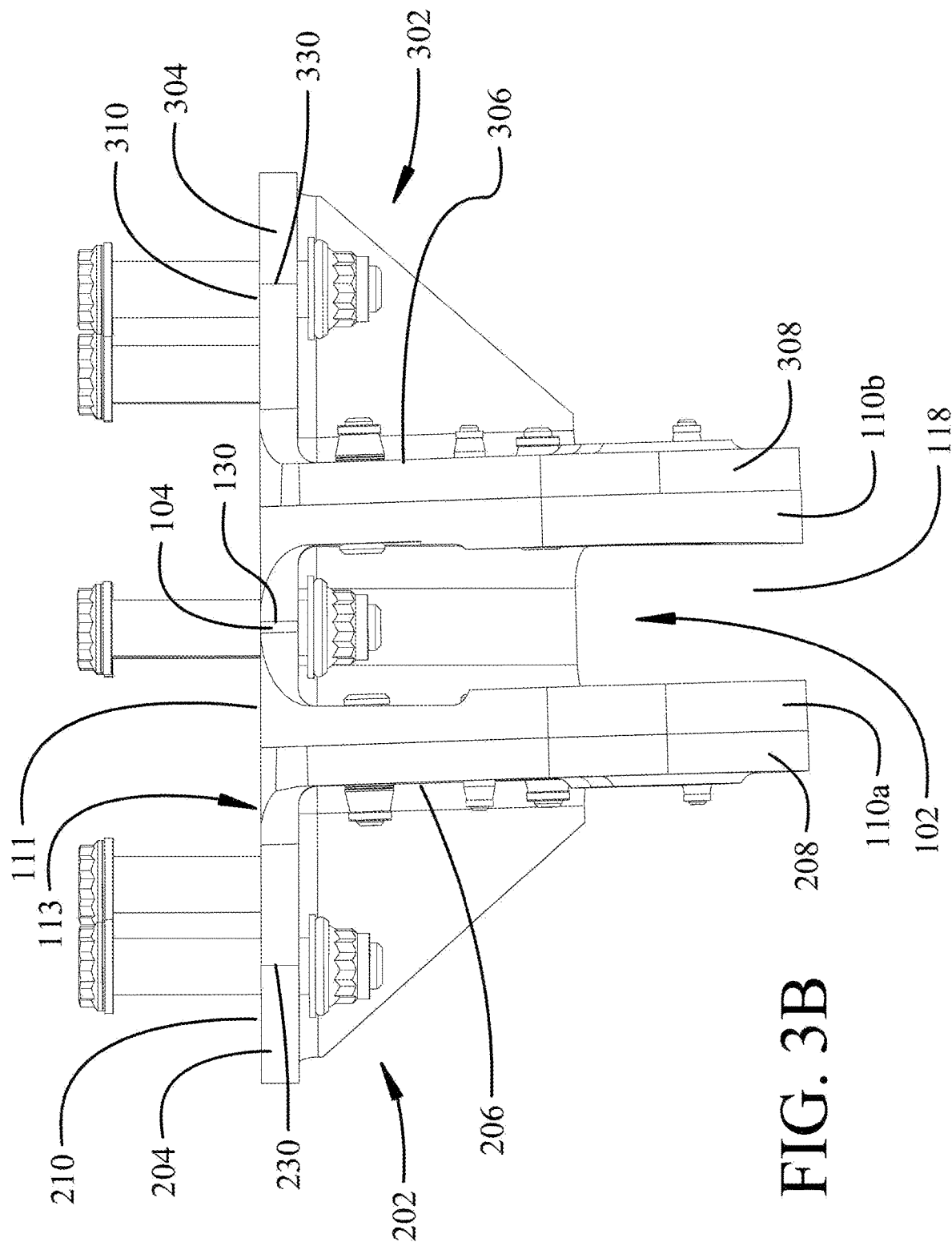
FIG. 3B is a rear view of the three piece failsafe clevis of FIG. 3A.
Figure 3C:
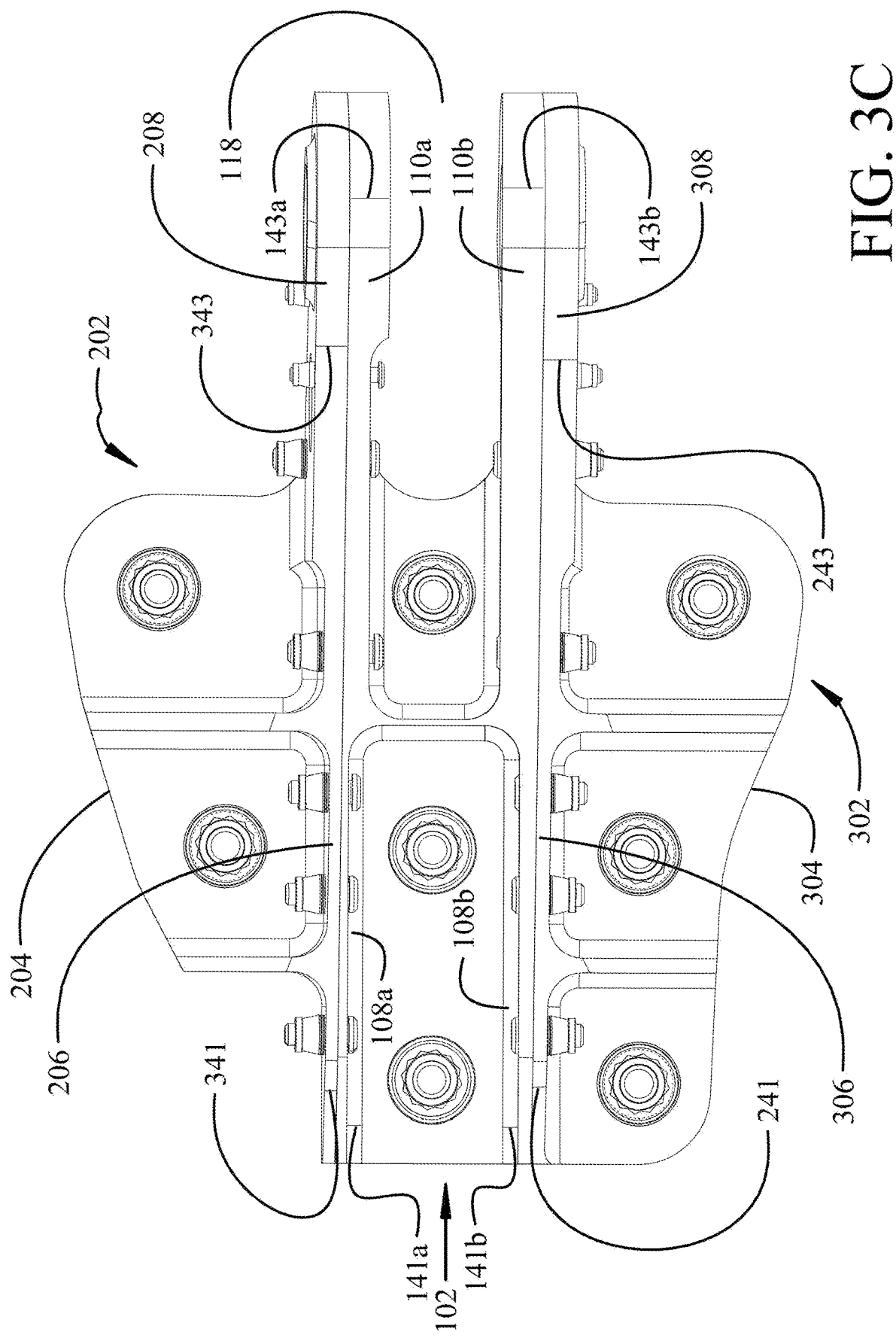
FIG. 3C is a bottom view of the three piece failsafe clevis of FIG. 3A.
Figure 3D:
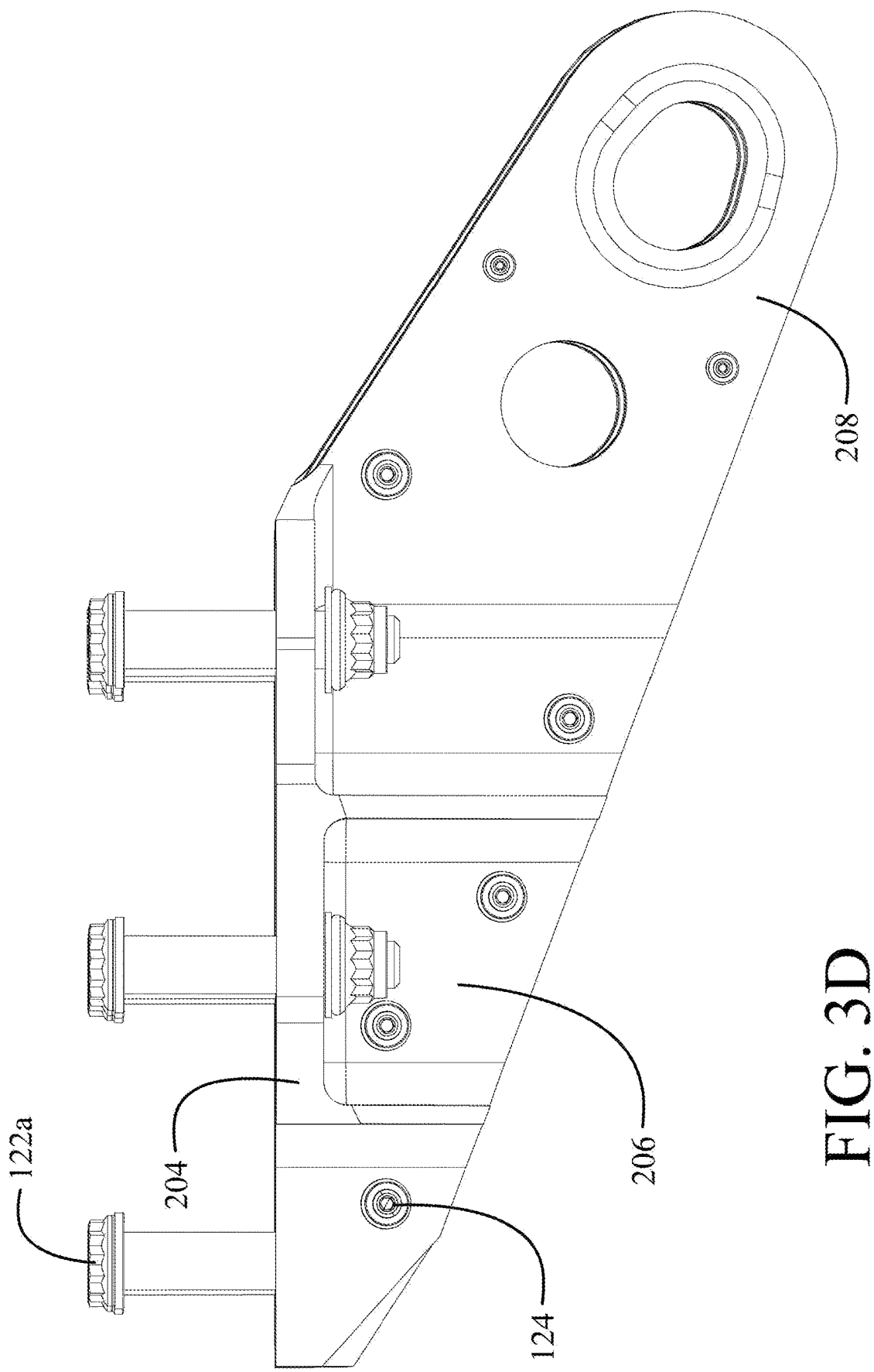
FIG. 3D is a side view of the three piece failsafe clevis of FIG. 3A.
Figure 3E:
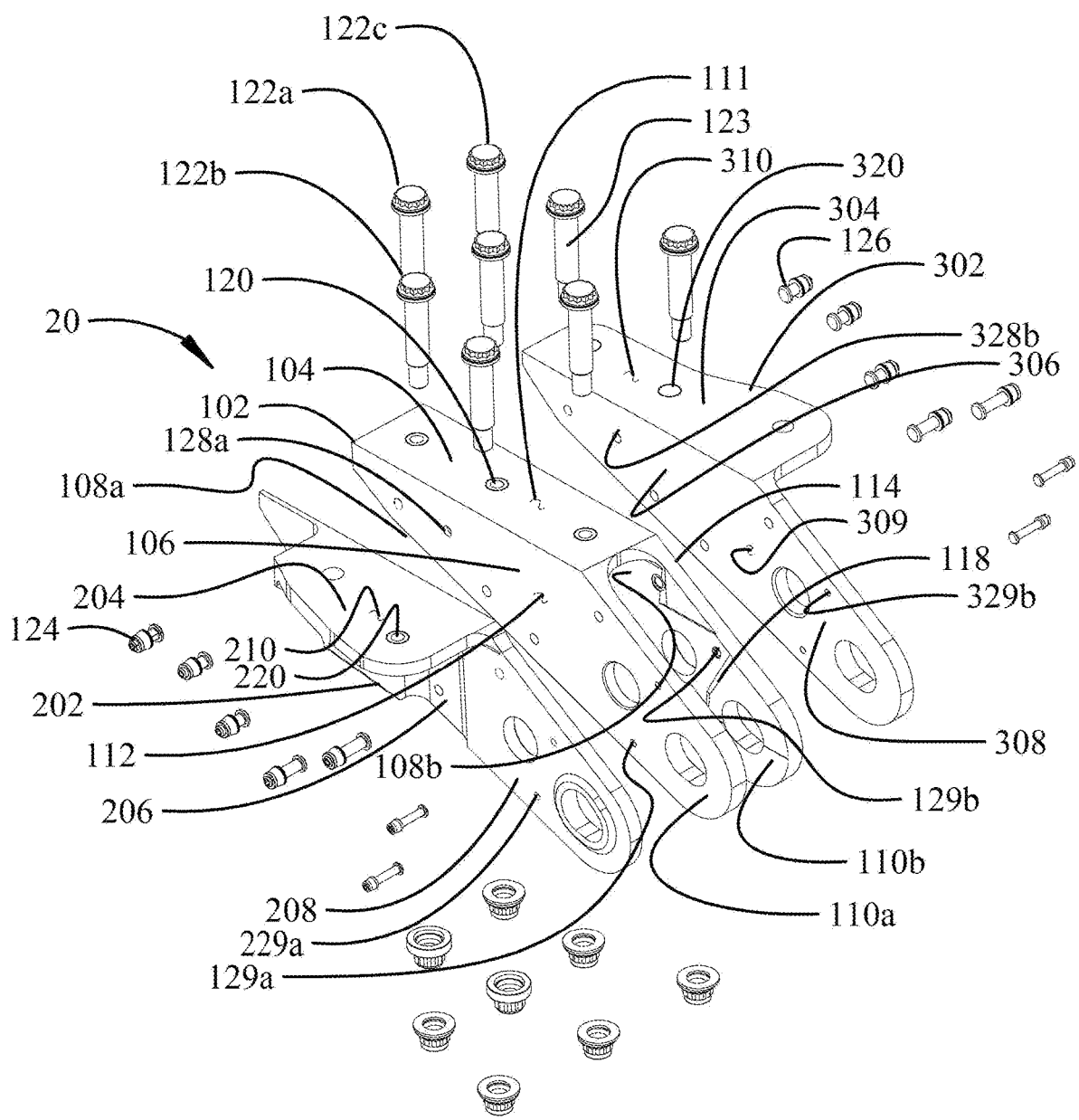
FIG. 3E is a rear left exploded view of the components of the three piece failsafe clevis of FIG. 3A.
Figure 3F:
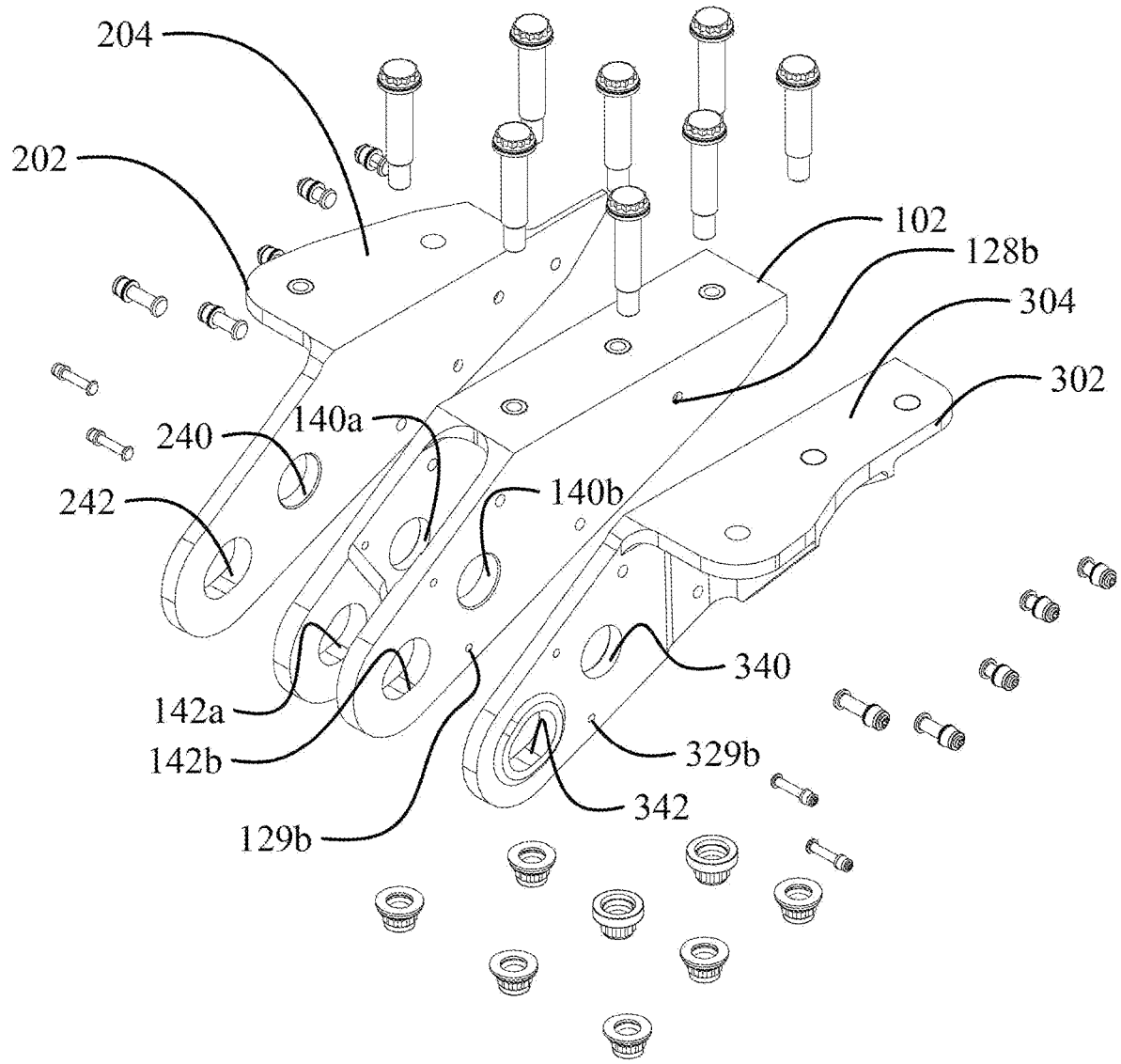
FIG. 3F is a rear right exploded view of the components of the three piece failsafe clevis of FIG. 3A.
Figure 3G:
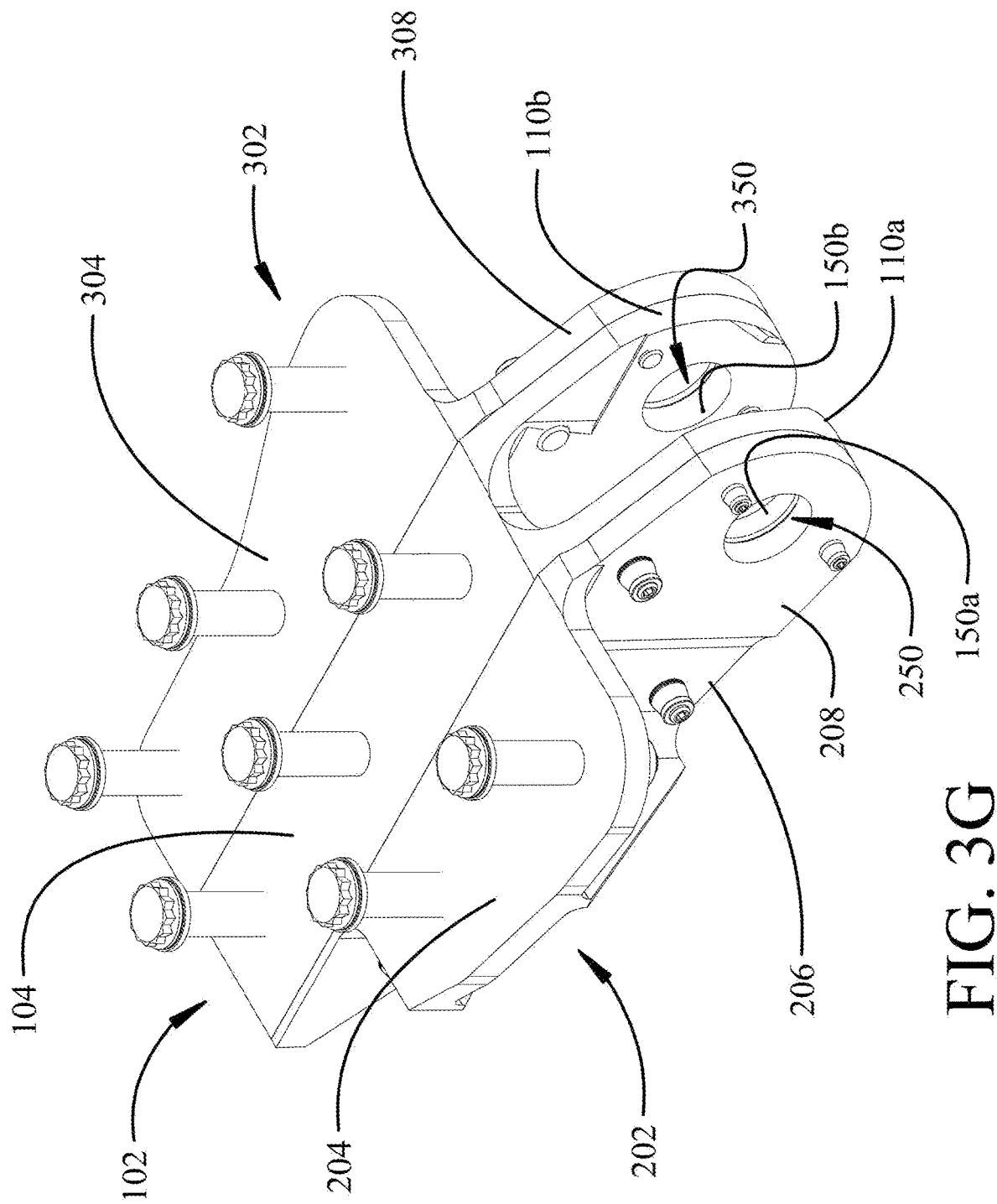
FIG. 3G is a rear pictorial view demonstrating an alternative configuration of the clevis for a single pin engagement.

In the described example implementation for engagement of the frangible pins 39a, 39b, a first pair of receiving holes 140a and 140b in the first and second inner tangs 110a and 110b are concentrically aligned with a first mating receiving hole 240 in the left outer tang 208 and a second mating receiving hole 340 in the right outer tang 308 and a second pair of receiving holes 142a and 142b are concentrically aligned with a third mating receiving hole 242 in the left outer tang 208 and a fourth mating receiving hole 342 in the right outer tang 308. In alternative implementations as shown in FIG. 3G, a single pair of receiving holes 150a and 150b in the first and second inner tangs 110a and 110b concentrically aligned with a first mating receiving hole 250 in the left outer tang 208 and a second mating receiving hole 350 in the right outer tang 308 may be employed for a single pin engagement.

Figure 4A:
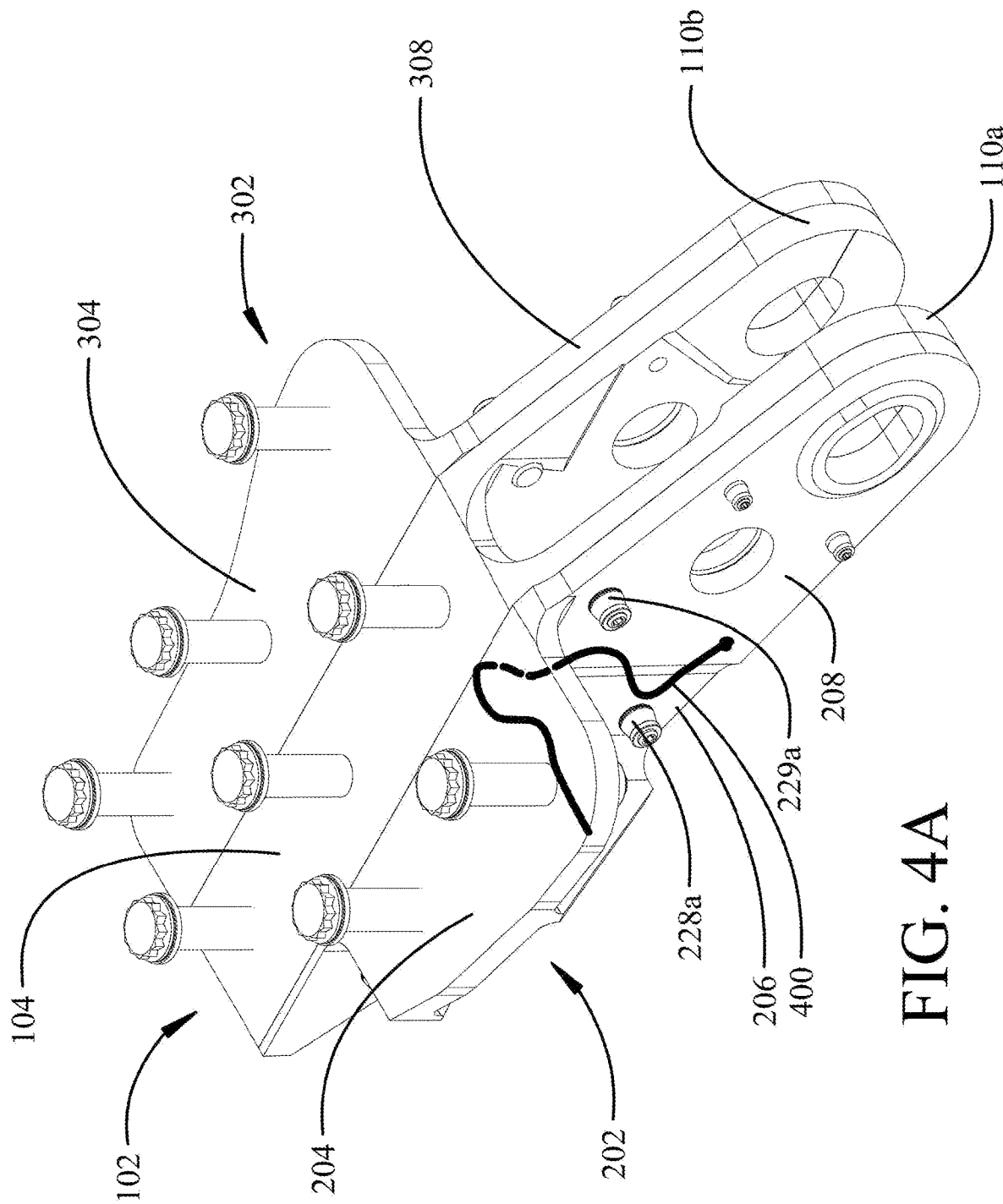
FIG. 4A is a pictorial view of a first failsafe condition with a crack in one of the outer components of the example implementation.
Figure 4B:
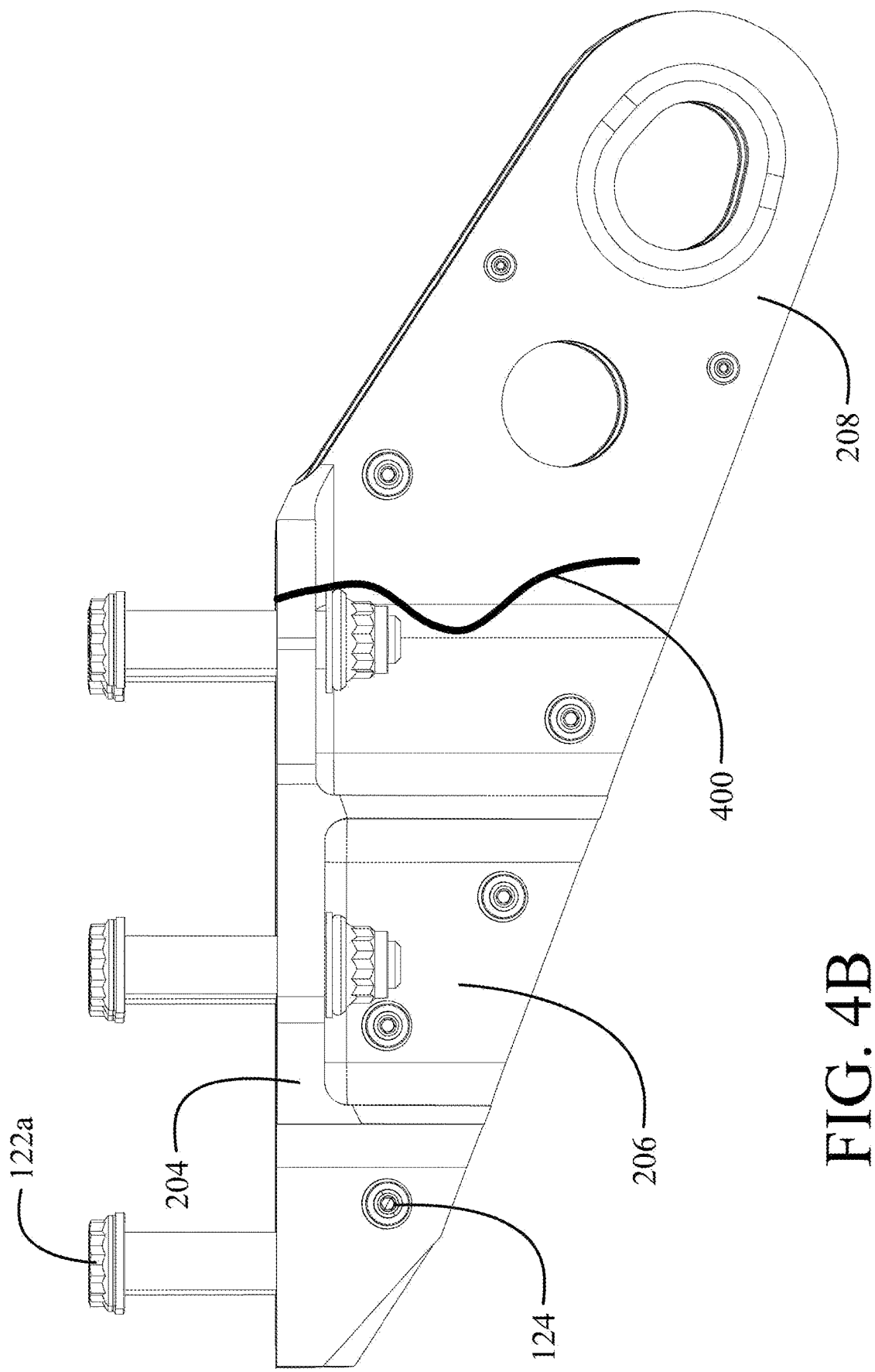
FIG. 4B is a side view of the first failsafe condition.

As seen in FIGS. 4A and 4B, geometric arrangement of the first mating array of holes 228a, second mating array of holes 328b, third mating array of holes 229a and fourth mating array of holes 329b is configured to surround potential propagating cracks in either the left or right outer flanges 206, 306 or the left or right outer tangs 208, 308 for transfer or load through the respective field fasteners to the left or right inner flanges 108a, 108b or left or right inner tangs 110a, 110b. Example crack 400 is shown in the left outer flange and left outer tang.

Figure 5:
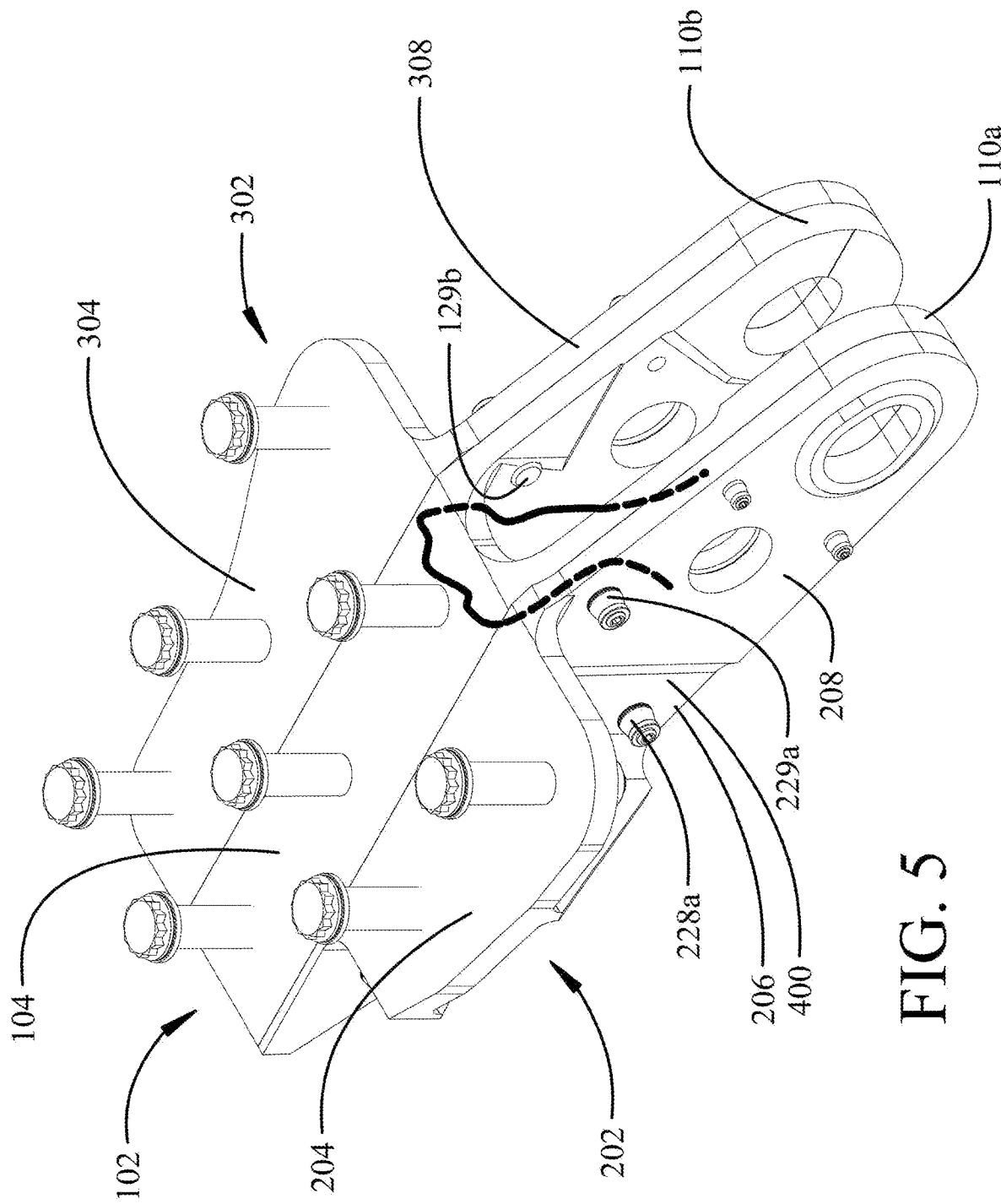
FIG. 5 is a pictorial view of a second failsafe condition with a crack in the center component of the example implementation.

Similarly, as seen in FIG. 5, geometric arrangement of the first array of holes 128a, second array of holes 128b, third array of holes 129a and fourth array of holes 129b is configured to surround potential propagating cracks in either the left or right inner flanges 108a, 108b or the left or right inner tangs 110a, 110b for transfer or load through the respective field fasteners to the left or right outer flanges 206, 306 or left or right outer tangs 208, 308.

The engagement of planar first inner surface 209 and first outer surface 112 and second inner surface 309 and second outer surface 114 provides very high tolerance engagement of the center portion 102, left lateral portion 202 and right lateral portion 302, limited only by machining tolerances of the planar surfaces. Similarly, very high tolerance is maintained in the planar top surface 113 with engagement of the center top surface 111, left top surface 210 and right top surface 310 on a high tolerance surface plate during installation of the field fasteners.

Thickness of the left or right outer flanges 206, 306 or the left or right outer tangs 208, 308, the left or right inner flanges 108a, 108b and the left or right inner tangs 110a, 110b may vary to accommodate fatigue mitigation. As seen in FIG. 3C, an outer flange forward thickness 241, 341 expands into an aft outer tang thickness 243, 343. Similarly, a forward inner flange thickness 141a, 141b expands into an aft inner tang thickness 143a, 143b.

Figure 6:
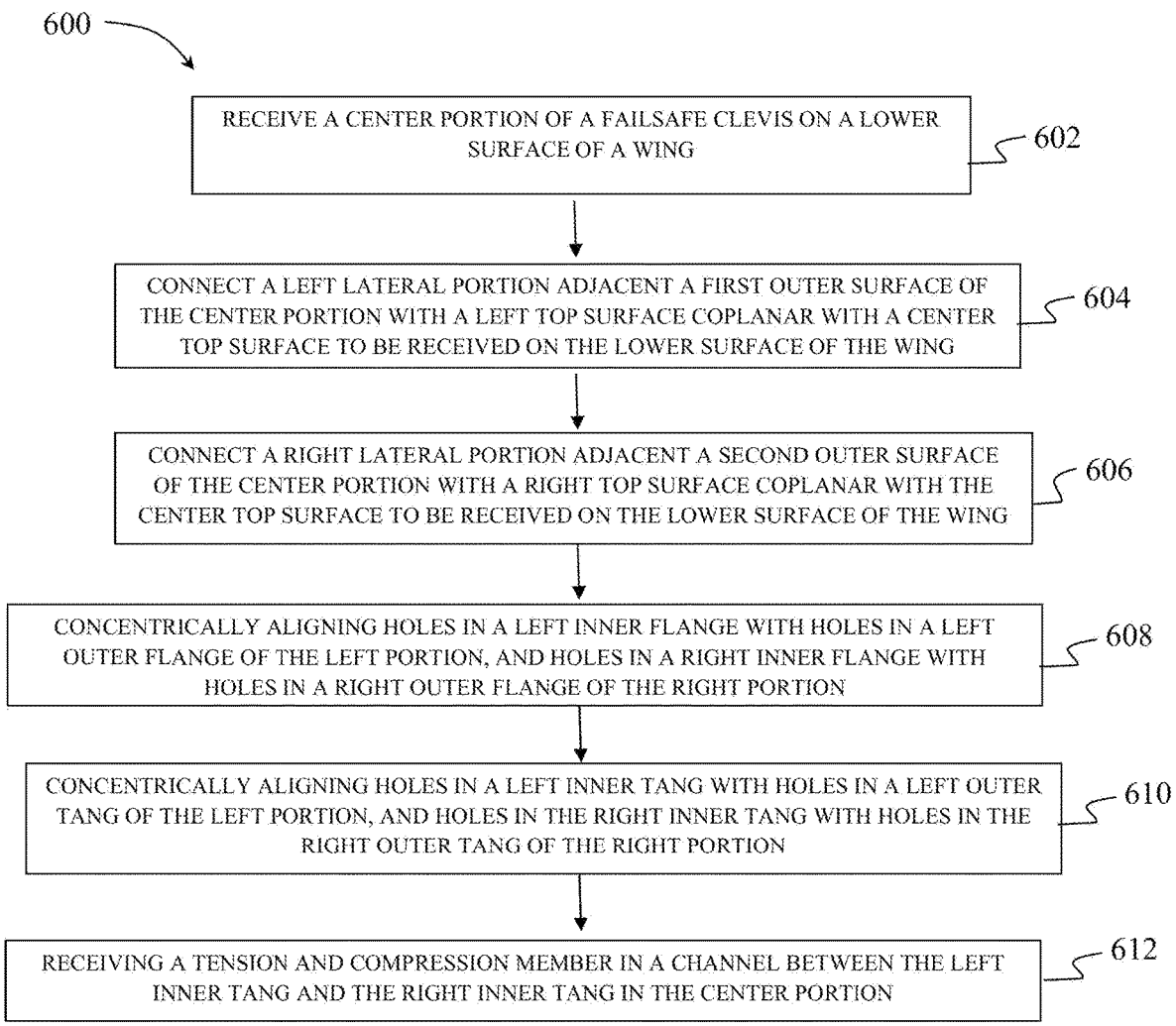
FIG. 6 is a flow chart of a method for engaging a tension and compression member with a three piece failsafe clevis.

The implementations described provide a method 600 of engaging a tension and compression member with a three piece failsafe clevis as shown in FIG. 6. A center portion having a center top surface is received on a lower surface of a wing, step 602, The center portion has a left inner flange and left inner tang with a planar first outer surface and a right inner flange and left inner tang with a planar second outer surface, said second outer surface oppositely oriented to the first outer surface.

A left lateral portion is connected adjacent the first outer surface using a first plurality of field fasteners with a left outer flange and a left outer tang having a planar first inner surface received against the first outer surface and a left top surface coplanar with the center top surface to be received on the lower surface of the wing, step 604.

A right lateral portion is connected adjacent the second outer surface using a second plurality of field fasteners with a right outer flange and a right outer tang having a planar first inner surface received against the first outer surface and a right top surface coplanar with the center top surface to be received on the lower surface of the wing, step 606.

A first array of holes in the left inner flange of the left portion is concentrically aligned with a first mating array of holes in the left outer flange, a second array of holes in the right inner flange is concentrically aligned with a second mating array of holes in the right outer flange, step 608.

A third array of holes in the left inner tang is concentrically aligned with a third mating array of holes in the left outer tang and a fourth array of holes in the right inner tang is concentrically aligned with a fourth mating array of holes in the right outer tang, step 610.

Geometric arrangement of the first mating array of holes, second mating array of holes, third mating array of holes and fourth mating array of holes is configured to surround potential propagating cracks in either the left or right outer flanges or the left or right outer tangs.

Geometric arrangement of the first array of holes, second array of holes, third array of holes and fourth array of holes is configured to surround potential propagating cracks in either the left or right inner flanges, or the left or right inner tangs. The tension and compression member is received in a channel between the left inner tang and right inner tang in the center portion, step 612.

Having now described various implementations in detail as required by the patent statutes, those skilled in the art will recognize modifications and substitutions to the specific implementations disclosed herein. Such modifications are within the scope and intent of the following claims. Within the specification and the claims, the terms "comprising", "incorporate", "incorporates" or "incorporating", "include", "includes" or "including", "has", "have" or "having", and "contain", "contains" or "containing" are intended to be open recitations and additional or equivalent elements may be present. The term "substantially" as used within the specification and claims means that the recited characteristic, parameter, or value need not be achieved exactly, but that deviations or variations, including for example, tolerances, measurement error, measurement accuracy limitations and other factors known to those skilled in the art, may occur in amounts that do not preclude the effect the characteristic was intended to provide. As used herein the terms "outboard" and "inboard" and "upper" and "lower" are employed to describe relative positioning and other than for the specific implementations disclosed may be substituted with appropriate descriptors such as "first" and "second", "top" and "bottom" or "right" and "left" depending on orientation of actual implementation.

What is claimed is:
1. A three piece failsafe clevis comprising:
  a center portion having a center top surface, a planar first outer surface and a planar second outer surface, said second outer surface oppositely oriented to the first outer surface, and a channel configured to receive a tension and compression link;
  a left lateral portion connected adjacent the first outer surface and having a planar first inner surface received against the first outer surface and a left top surface coplanar with the center top surface; and a right lateral portion connected adjacent the second outer surface and having a planar second inner surface received against the second outer surface and a right top surface coplanar with the center top surface, the coplanar center top surface, left top surface and right top surface providing a single planar top surface of the failsafe clevis, wherein the center top flange has a first plurality of holes configured to receive a first plurality of fasteners, the left top flange has a plurality of holes to receive a second plurality of fasteners and the right top flange has a third plurality of holes to receive a third plurality of fasteners, wherein the first plurality of fasteners, second plurality of fasteners and third plurality have an equal grip length.

2. The three piece failsafe clevis as defined in claim 1 wherein the center portion comprises:
 a center top flange having the center top surface; and
 a body portion having a left inner flange and a right inner flange perpendicularly depending from the center top flange;
 a left inner tang extending rearward from the left inner flange and a right inner tang extending rearward from the right inner flange;
 wherein the left inner flange and the left inner tang commonly form the planar first outer surface and the right inner flange and the right inner tang commonly form the planar second outer surface.

3. The three piece failsafe clevis as defined in claim 2 wherein the left lateral portion comprises:
 a left top flange having the left top surface;
 a left outer flange perpendicularly depending from the left top flange; and
 a left outer tang extending rearward from the left outer flange, wherein the left outer flange and the left outer tang commonly form the planar first inner surface.

4. The three piece failsafe clevis as defined in claim 3 wherein the right lateral portion comprises:
 a right top flange having the right top surface;
 a right outer flange perpendicularly depending from the right top flange; and
 a right outer tang extending rearward from the right outer flange, wherein the right outer flange and the right outer tang commonly form the planar second inner surface.

5. The three piece failsafe clevis as defined in claim 4 wherein the center top flange has a first thickness, left top flange has a second thickness and the right top flange has a third thickness, the first, second and third thicknesses being equal.

6. The three piece failsafe clevis as defined in claim 4 wherein
 a first array of holes in the left inner flange is in concentric alignment with a first mating array of holes in the left outer flange;
 a second array of holes in the right inner flange is in concentric alignment with a second mating array of holes in the right outer flange;
 a third array of holes in the left inner tang is in concentric alignment with a third mating array of holes in the left outer tang; and
 a fourth array of holes in the right inner tang is in concentric alignment with a fourth mating array of holes in the right outer tang.

7. The three piece failsafe clevis as defined in claim 6 wherein
 the first array of holes, first mating array of holes, third array of holes and third mating array of holes receive a first plurality of field fasteners to affix the left lateral portion to the center portion; and,
 the second array of holes, second mating array of holes, fourth array of holes and fourth mating array of holes receive a second plurality of field fasteners to affix the right lateral portion to the center portion.

8. The three piece failsafe clevis as defined in claim 7 wherein geometric arrangement of the first mating array of holes, second mating array of holes, third mating array of holes and fourth mating array of holes is configured to surround potential propagating cracks in either the left or right outer flanges or the left or right outer tangs.

9. The three piece failsafe clevis as defined in claim 7 wherein geometric arrangement of the first array of holes, second array of holes, third array of holes and fourth array of holes is configured to surround potential propagating cracks in either the left or right inner flanges, or the left or right inner tangs.

10. A three niece clevis comprising:
 a center portion having a center top surface, a planar first outer surface and a planar second outer surface, said second outer surface oppositely oriented to the first outer surface, and a channel configured to receive a tension and compression link, wherein the center portion comprises:
  a center top flange having the center top surface; and
  a body portion having a left inner flange and a right inner flange perpendicularly depending from the center top flange;
  a left inner tang extending rearward from the left inner flange an a right inner tang extending rearward from the right inner flange;
  wherein the left inner flange and the left inner tang commonly form the planar first outer surface and the right inner flange and the right inner tang commonly form the planar second outer surface;
 a left lateral portion connected adjacent the first outer surface and having a planar first inner surface received against the first outer surface and a left top surface coplanar with the center top surface, wherein the left lateral portion comprises:
  a left top flange having the left top surface;
  a left outer flange perpendicularly depending from the left top flange; and
  a left outer tang extending rearward from the left outer flange, wherein the left outer flange and the left outer tang commonly form the planar first inner surface;
  and a right lateral portion connected adjacent the second outer surface and having a planar second inner surface, wherein the right lateral portion comprises:
  a right top flange having the right top surface;
  a right outer flange perpendicularly depending from the right top flange; and a right outer tang extending rearward from the right outer flange, wherein the right outer flange and the right outer tang commonly form the planar second inner surface, and
 wherein the center top flange has a first plurality of holes configured to receive a first plurality of fasteners, the left top flange has a plurality of holes to receive a second plurality of fasteners and the right top flange has a third plurality of holes to receive a third plurality of fasteners, wherein the first plurality of fasteners, second plurality of fasteners and third plurality of fasteners have an equal grip length.

11. An aircraft having a wing with a system of operating flaps said system comprising:

a plurality of flaps each having a plurality of flap supports;

at least one actuator supported in at least one of the plurality of flap supports;

at least one carrier beam to support one of said plurality of flaps, said carrier beam rotatably engaged in at least one flap support rib;

a tension and compression link engaged to the flap support rib:

a three piece failsafe clevis connected to a lower surface of the wing and having a center portion having a center top surface received on the lower surface, a planar first outer surface and a planar second outer surface, said second outer surface oppositely oriented to the first outer surface, and a channel configured to receive a- tension and compression link;

a left lateral portion connected adjacent the first outer surface and having a planar first inner surface received against the first outer surface and a left top surface coplanar with the center top surface and received on the lower surface; and a right lateral portion connected adjacent the second outer surface and having a planar second inner surface received against the second outer surface and a right top surface coplanar with the center top surface and received on the lower surface.

12. The aircraft as defined in claim 11 wherein the left lateral portion comprises:

a left top flange having the left top surface;

a left outer flange perpendicularly depending from the left top flange; and a left outer tang extending rearward from the left outer flange, wherein the left outer flange and the left outer tang commonly form the planar first inner surface.

13. The aircraft as defined in claim 12 wherein the right lateral portion comprises:

a right top flange having the right top surface;

a right outer flange perpendicularly depending from the right top flange; and a right outer tang extending rearward from the right outer flange, wherein the right outer flange and the right outer tang commonly form the planar second inner surface.

14. The aircraft as defined in claim 13 wherein the center top flange has a first thickness, left top flange has a second thickness and the right top flange has a third thickness, the first, second and third thicknesses being equal.

15. The aircraft as defined in claim 14 wherein the center top flange has a first plurality of holes configured to a first plurality of fasteners, the left top flange has a second plurality of holes to receive a second plurality of fasteners and the right top flange has a third plurality of holes to receive a third plurality of fasteners, wherein the first plurality of fasteners, second plurality of fasteners and third plurality of fasteners have an equal grip length for connection to the lower surface.

16. A method for engaging a tension and compression member with a three piece failsafe clevis, the three piece failsafe clevis comprising:

a center portion having a center top surface, a planar first outer surface and a planar second outer surface, said second outer surface oppositely oriented to the first outer surface, and a channel configured to receive a tension and compression link;

a left lateral portion connected adjacent the first outer surface and having a planar first inner surface received against the first outer surface and a left top surface coplanar with the center top surface; and a right lateral portion connected adjacent the second outer surface and having a planar second inner surface received against the second outer surface and a right top surface coplanar with the center top surface, the coplanar center top surface, left top surface and right top surface providing a single planar top surface of the failsafe clevis, wherein the center top flange has a first plurality of holes configured to receive a first plurality of fasteners, the left top flange has a plurality of holes to receive a second plurality of fasteners and the right top flange has a third plurality of holes to receive a third plurality of fasteners, the method comprising:

receiving the center top surface on a lower surface of a wing, the center portion having a left inner flange and left inner tang with a planar first outer surface and a right inner flange and a right inner tang with a planar second outer surface, said second outer surface oppositely oriented to the first outer surface;

connecting the left lateral portion adjacent the first outer surface using a first plurality of field fasteners with a left outer flange and a left outer tang having a planar first inner surface received against the first outer surface and a left top surface coplanar with the center top surface and received on the lower surface;

connecting the right lateral portion adjacent the second outer surface using a second plurality of field fasteners with a right outer flange and a right outer tang having a planar first inner surface received against the first outer surface and a right top surface coplanar with the center top surface and received on the lower surface; and receiving the tension and compression member in a channel between the left inner tang and right inner tang in the center portion.

17. The method as defined in claim 16 further comprising:

concentrically aligning a first array of holes in the left inner flange of the left portion with a first mating array of holes in the left outer flange; and concentrically aligning a second array of holes in the right inner flange a second mating array of holes in the right outer flange.

18. The method as defined in claim 17 further comprising:

concentrically aligning a third array of holes in the left inner tang with a third mating array of holes in the left outer tang; and concentrically aligning a fourth array of holes in the right inner tang with a fourth mating array of holes in the right outer tang.

19. The method as defined in claim 18 further comprising:

geometrically arranging the first mating array of holes, second mating array of holes, third mating array of holes and fourth mating array of holes to surround potential propagating cracks in either the left or right outer flanges or the left or right outer tangs.

20. The method as defined in claim 19 further comprising geometrically arranging the first array of holes, second array of holes, third array of holes and fourth array of holes to surround potential propagating cracks in either the left or right inner flanges, or the left or right inner tangs.

* * * * *

UNITED STATES PATENT AND TRADEMARK OFFICE
CERTIFICATE OF CORRECTION

PATENT NO. : 11,933,353 B2  
APPLICATION NO. : 17/665283  
DATED : March 19, 2024  
INVENTOR(S) : Andrew Smeal and Kevin Tsai Page 1 of 1

It is certified that error appears in the above-identified patent and that said Letters Patent is hereby corrected as shown below:

In the Claims

In Claim 1, Column 7, Lines 13-14, "third plurality have" is corrected to read "third plurality of fasteners have".
In Claim 10, Column 8, Line 31, "an a" is corrected to read "and a".
In Claim 10, Column 8, Lines 49-50, "second inner surface, wherein" is corrected to read "second inner surface received against the second outer surface and a right top surface coplanar with the center top surface, wherein".
In Claim 11, Column 9, Line 15, "receive a-" is corrected to read "receive the".

Signed and Sealed this
Seventeenth Day of September, 2024

Katherine Kelly Vidal
*Director of the United States Patent and Trademark Office*